US012645533B2

(12) United States Patent
Rochman

(10) Patent No.: US 12,645,533 B2
(45) Date of Patent: Jun. 2, 2026

(54) SYSTEMS, METHODS, AND DEVICES FOR ERROR CORRECTION IN NONVOLATILE MEMORIES

(71) Applicant: Infineon Technologies LLC, San Jose, CA (US)

(72) Inventor: Amir Rochman, Tel-Aviv (IL)

(73) Assignee: Infineon Technologies LLC, San Jose, CA (US)

( * ) Notice: Subject to any disclaimer, the term of this patent is extended or adjusted under 35 U.S.C. 154(b) by 118 days.

(21) Appl. No.: 18/807,716

(22) Filed: Aug. 16, 2024

(65) Prior Publication Data

US 2026/0050511 A1     Feb. 19, 2026

(51) Int. Cl.
*G06F 11/10* (2006.01)

(52) U.S. Cl.
CPC ...... *G06F 11/1068* (2013.01); *G06F 11/1004* (2013.01)

(58) Field of Classification Search
CPC ............. G06F 11/1004; G06F 11/1068; G06F 11/1072; G06F 11/1076
See application file for complete search history.

(56) References Cited

U.S. PATENT DOCUMENTS

| | | | |
|---|---|---|---|
| 2005/0169057 A1* | 8/2005 | Shibata | G11C 11/5628 |
| | | | 365/185.28 |
| 2008/0263266 A1* | 10/2008 | Sharon | G11C 16/28 |
| | | | 711/E12.008 |
| 2013/0104005 A1 | 4/2013 | Weingarten et al. | |
| 2022/0028478 A1* | 1/2022 | Park | G11C 7/1057 |

FOREIGN PATENT DOCUMENTS

WO     WO-2009095902 A2 *  8/2009  ......... G11C 16/3463

OTHER PUBLICATIONS

International Search Report and Written Opinion of the International Searching Authority for International Application No. PCT/US25/41608 dated Oct. 23, 2025; 9 pages.

* cited by examiner

*Primary Examiner* — Shelly A Chase

(57)     ABSTRACT

Systems, methods, and devices provide error correction in such nonvolatile memories. Methods include identifying a read operation associated with a nonvolatile memory array, performing a plurality of sensing operations on the nonvolatile memory array, the plurality of sensing operations comprising a plurality of comparisons between sensed values and reference values, and generating a plurality of data outputs based on the plurality of sensing operations. Methods further include generating a plurality of results based on the plurality of data outputs, wherein each of the plurality of results identifies a number of errors associated with at least one of the plurality of data outputs, and selecting a data output of the plurality of data outputs based, at least in part, on the identified number of errors.

20 Claims, 11 Drawing Sheets

Nonvolatile Memory 106

Memory Array 108

Sensing Circuit 110

Error Correction Circuit 112

Processor System 102

Processor Core 104

107

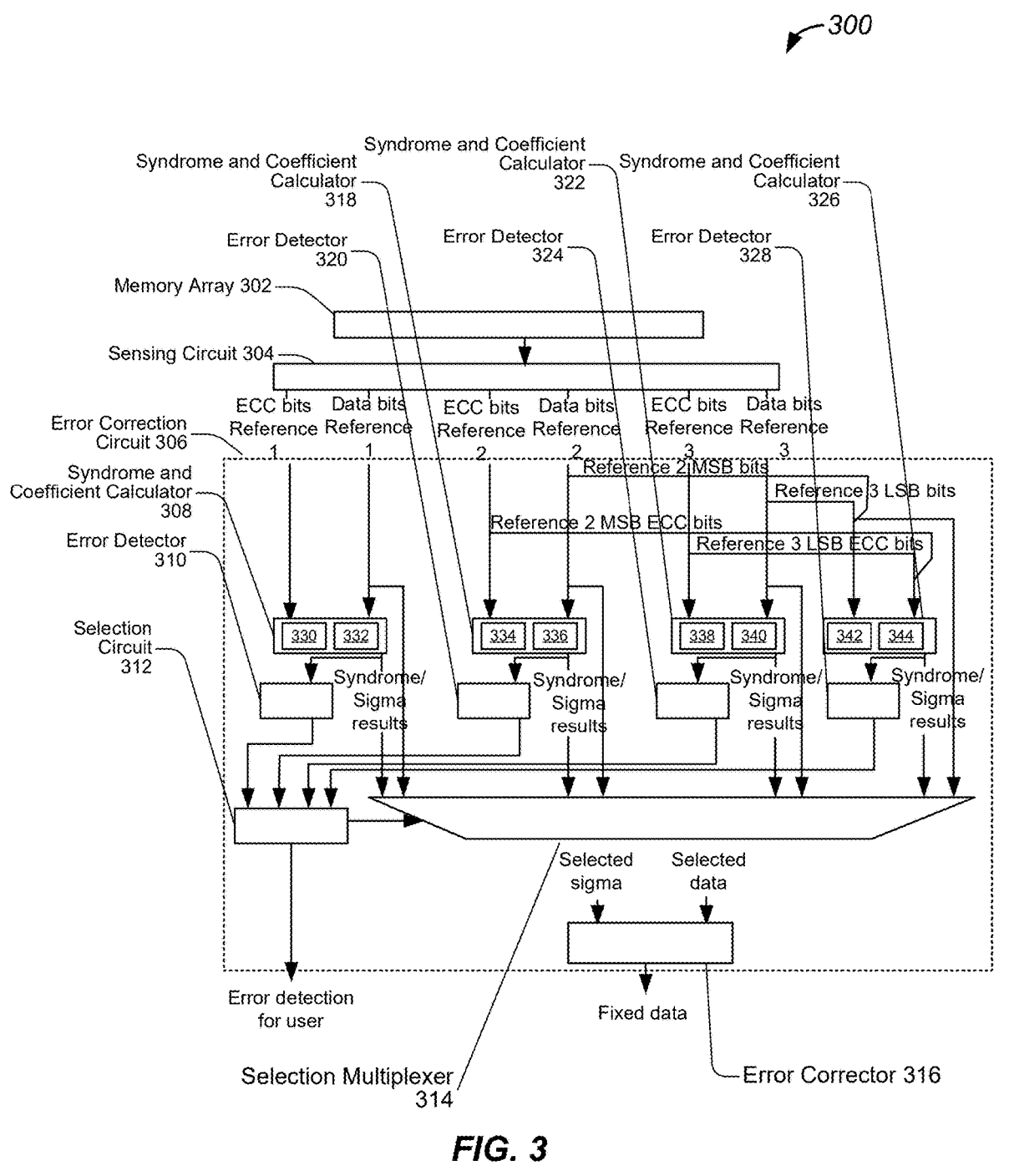

*300*

Syndrome and Coefficient Calculator — 318

Syndrome and Coefficient Calculator — 322

Syndrome and Coefficient Calculator — 326

Error Detector 320

Error Detector 324

Error Detector 328

Memory Array 302

Sensing Circuit 304

ECC bits Reference 1     Data bits Reference 1     ECC bits Reference 2     Data bits Reference 2     ECC bits Reference 3     Data bits Reference 3

Error Correction Circuit 306

Syndrome and Coefficient Calculator — 308

Error Detector 310

Selection Circuit — 312

Reference 2 MSB bits

Reference 3 LSB bits

Reference 2 MSB ECC bits

Reference 3 LSB ECC bits 330  332     334  336     338  340     342  344

Syndrome/ Sigma results     Syndrome/ Sigma results     Syndrome/ Sigma results     Syndrome/ Sigma results Selected sigma     Selected data Error detection for user Fixed data Selection Multiplexer 314

Error Corrector 316

FIG. 3

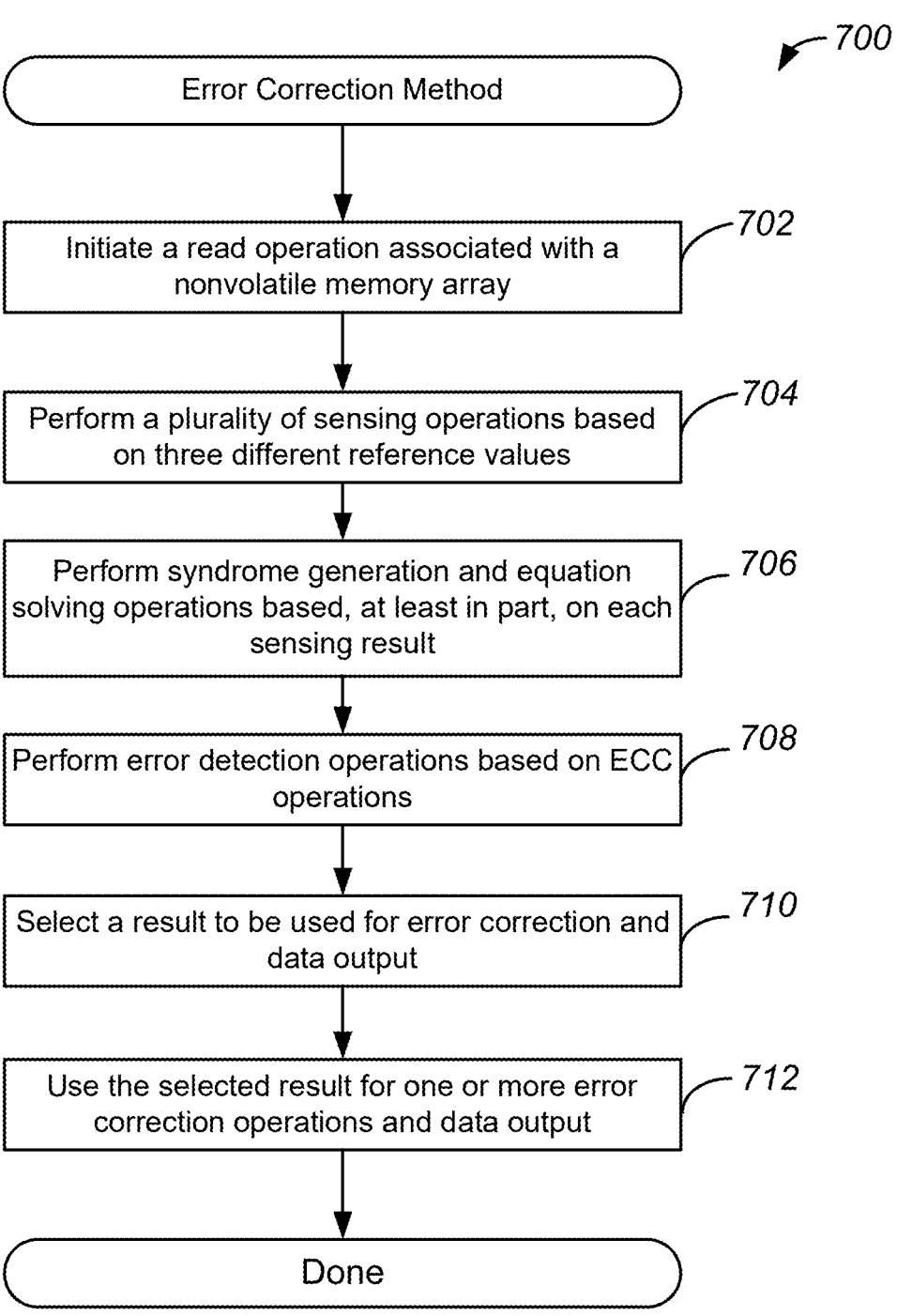

*700*

Error Correction Method

*702*

Initiate a read operation associated with a nonvolatile memory array

*704*

Perform a plurality of sensing operations based on three different reference values

*706*

Perform syndrome generation and equation solving operations based, at least in part, on each sensing result

*708*

Perform error detection operations based on ECC operations

*710*

Select a result to be used for error correction and data output

*712*

Use the selected result for one or more error correction operations and data output Done

*FIG. 7*

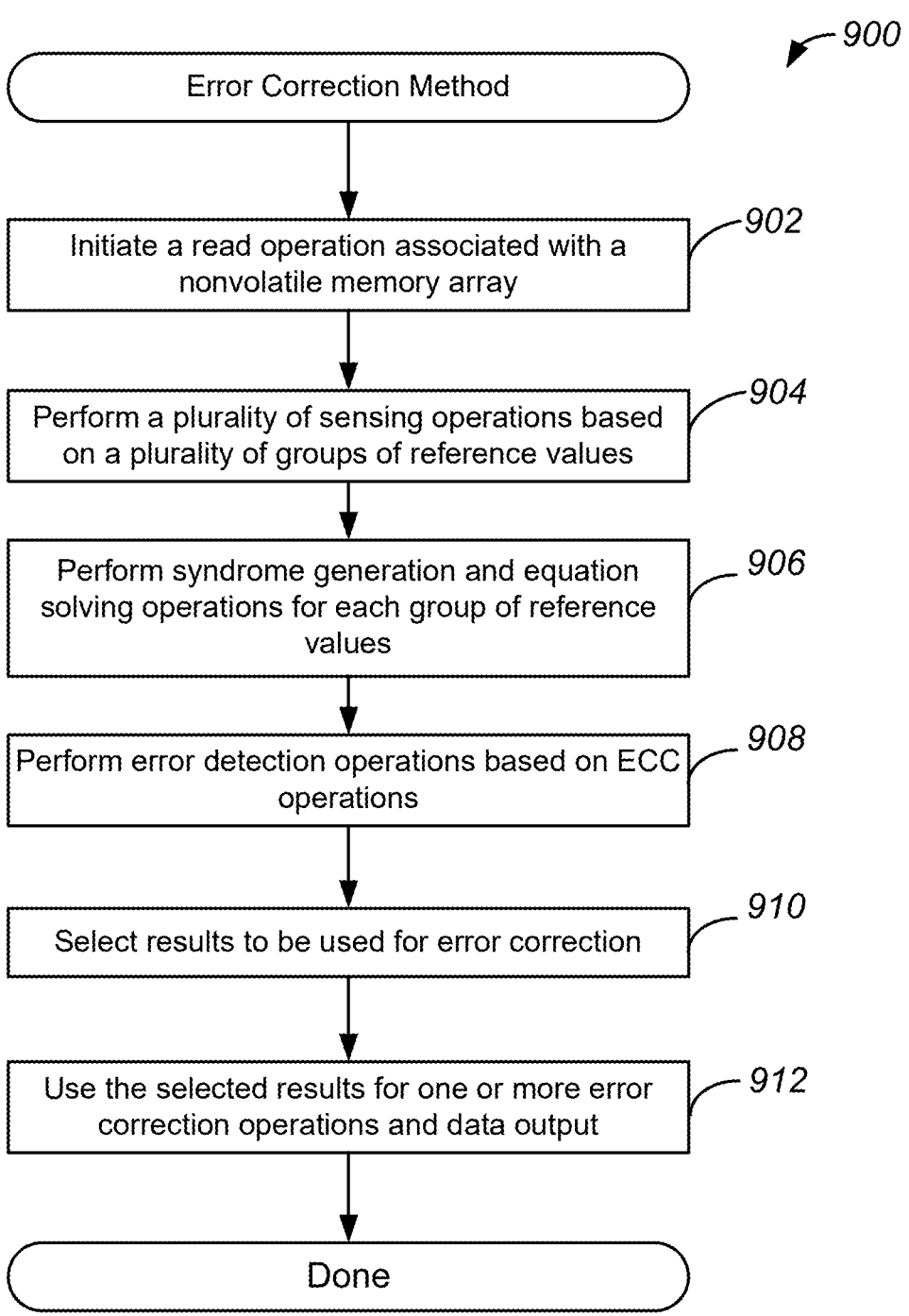

*900*

Error Correction Method

*902*
Initiate a read operation associated with a nonvolatile memory array

*904*
Perform a plurality of sensing operations based on a plurality of groups of reference values

*906*
Perform syndrome generation and equation solving operations for each group of reference values

*908*
Perform error detection operations based on ECC operations

*910*
Select results to be used for error correction

*912*
Use the selected results for one or more error correction operations and data output Done

FIG. 9

SYSTEMS, METHODS, AND DEVICES FOR ERROR CORRECTION IN NONVOLATILE MEMORIES

TECHNICAL FIELD

This disclosure relates to nonvolatile memories, and more specifically, to enhancement of error correction in such nonvolatile memories.

BACKGROUND

Nonvolatile memory devices may store data values in memory cells. Such memory cells may be sensed to read such stored data values, and error detection operations may be performed to determine if the data value that has been read includes an error. For example, the stored data value may be misidentified as a data value such as a "1" and a "0" that may be different than an originally programmed data value. Conventional techniques for being able to correct such errors remain limited because they may require larger numbers of bits to be able to correct such errors as well as a larger die size to accommodate such bits.

BRIEF DESCRIPTION OF THE DRAWINGS

FIG. 3 illustrates another example of a memory device, configured in accordance with some embodiments.

FIG. 7 illustrates another example of a method for error correction, performed in accordance with some embodiments.

FIG. 9 illustrates an example of a method for error correction, performed in accordance with some embodiments.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Memory devices may include memory arrays that include arrays of nonvolatile memory cells. Moreover, such memory devices may be error correction code (ECC) memories that use an error correction code to detect and correct data corruption that may have occurred within the nonvolatile memory cells. More specifically, such ECC correction operations may be performed during a read operation when data is being read out from memory. Conventional techniques for being able to perform error correction operations remain limited because they might need a larger number of bits to be able to correct errors as well as a larger die size to accommodate such bits Embodiments disclosed herein provide multiple reference signals when reading data values from a memory cell, thus allowing for the selection of a best reference value to improve the overall capabilities of error correction in different situations. As will be discussed in greater detail below, during a sensing operation, multiple reference values may be used having different voltages. ECC detection operations may be performed using data outputs associated with the reference values, and selection logic may select a reference value that generates the best result. The selected result may then be used for subsequent error correction operations that are used to repair the data. As will also be discussed in greater detail below, the use of multiple reference values also provides improved error correction when multiple errors may be present, and in advanced memory cell configurations, such as multi-level memory cells that store multiple data values as well as cell configurations that have multiple single-level bits in one memory cell, such as two single-level bits in one memory cell, or even two multi-level bits in one memory cell.

Figure 1:
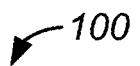
FIG. 1 illustrates an example of a memory system, configured in accordance with some embodiments.

FIG. 1 illustrates an example of a memory system, configured in accordance with some embodiments. As similarly discussed above, a memory system, such as system 100, may include a nonvolatile memory that is configured to perform error correction operations to detect and repair data values included in a memory array. As will be discussed in greater detail below, components of the nonvolatile memory may be configured to use multiple reference values to improve capabilities of such error correction operations by providing multiple available reference values that may be used for such error correction operations.

In various embodiments, system 100 may include processor system 102 which may be a host processor configured to execute one or more processing operations for a computing device or system that includes system 100. Accordingly, processor system 102 may include one or more processor cores, such as processor core 104, configured to perform such processing operations, and also configured to issue read and write commands to a memory, such as nonvolatile memory 106 discussed in greater detail below.

System 100 additionally includes nonvolatile memory 106 which may be communicatively coupled to processor system 102 via, at least in part, an interface, such as interface 107. In various embodiments, nonvolatile memory 106 includes a nonvolatile memory array, such as memory array 108, which is configured to include an array of memory cells configured to store data values. In some embodiments, the memory cells may be configured to store a data value having two possible states, such as a "1" and a "0". In various embodiments, the memory cells may be configured to store a data value having multiple possible states implemented via additional layers. Additional details regarding such data values and distribution of values associated with each possible state are discussed in greater detail below with reference to FIG. 8.

In various embodiments, nonvolatile memory 106 additionally includes sensing circuit 110 coupled to memory array 108 and configured to perform one or more sensing operations to take one or more measurements for a selected memory cell. Accordingly, sensing circuit 110 is configured to select and measure a property, such as a voltage, of a memory cell to obtain a measurement. Moreover, the sensed value that may be a measured voltage may be compared with a reference value to identify a stored data value. In one example, if 128 bits are ready from memory array 108, and three different reference values are used, a total of 384 comparisons may be made. In this way, memory cells may be scanned and measured to read data out of memory array 108.

Nonvolatile memory 106 additionally includes error correction circuit 112 which may be coupled to sensing circuit 110 as well as a communications interface. Accordingly, error correction circuit 112 may be configured to determine if data read out of memory array 108 should be repaired, and may perform such repair operations if appropriate. Moreover, error correction circuit 112 may return an output to another component, such as processor system 102, as a result of a read operation. As will be discussed in greater detail below, error correction circuit 112 may be configured to dynamically select a best reference value used for error correction operations. For example, multiple reference values may be used for a single read operation, and a best result may be selected based on one or more performance metrics. In this way, capabilities of error correction circuit 112 is improved without implementation of additional bits in the error correction code. In various embodiments, ECC bits may be stored in memory array 108.

Figure 2:
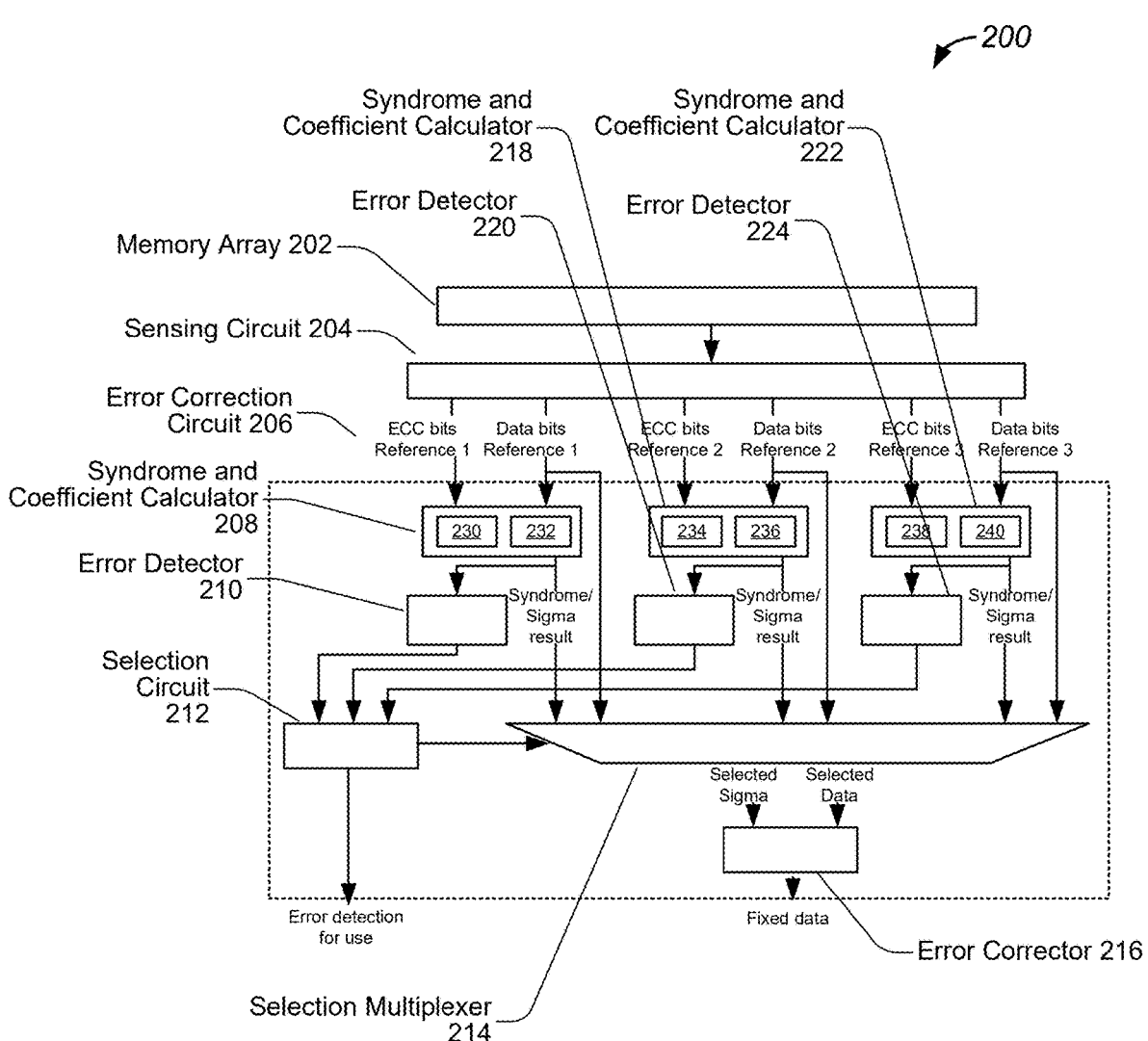
FIG. 2 illustrates an example of a memory device, configured in accordance with some embodiments.

FIG. 2 illustrates an example of a memory device, configured in accordance with some embodiments. As similarly discussed above, a memory device, such as device 200, may include a memory array, a sensing circuit, and an error correction circuit. Moreover, components of device 200 may be configured to perform error correction operations to detect and repair data values included in a memory array. As will be discussed in greater detail below, such components of device 200 may be configured to use multiple reference values to increase capabilities of such error correction operations.

In various embodiments, device 200 may include memory array 202 which may be configured to include an array of memory cells configured to store data values. As similarly discussed above, the memory cells may be configured to store a data value having two possible states, such as a "1" and a "0". In some embodiments, the memory cells may be configured to store a data value having multiple possible states implemented via additional levels. As shown in FIG. 2, memory array 202 may be coupled to sensing circuit 204 which may be configured to perform sensing operations to obtain measurements from selected memory cells. Accordingly, sensing circuit 204 may be configured to generate one or more outputs providing data bits representing the read data. Sensing circuit 204 may also provide ECC bits used for error correction operations. As shown in FIG. 2, sensing circuit 204 is configured to generate three pairs of such outputs based, at least in part, on three reference values. As will be discussed in greater detail below, the three reference values may be three different reference voltages.

Device 200 further includes error correction circuit 206 which is coupled to sensing circuit 204 and configured to receive the outputs generated by sensing circuit 204. Moreover, error correction circuit 206 may include a syndrome and coefficient calculator, such as syndrome and coefficient calculator 208, and an error detector, such as error detector 210, for each reference value and their associated outputs of sensing circuit 204. For example, ECC bits and data bits may be provided to syndrome and coefficient calculator 208 which may include syndrome generator 230 and equation solver 232, and may be configured to generate a syndrome and sigma results provided to error detector 210. Error detector 210 may then generate an output that provides a result of a determination of whether or not an error has been detected as well as an identification of how many errors have been detected, and such an output may be provided to error detector 210. It will be appreciated that such error detection operations may be performed in accordance with BCH ECC techniques. Accordingly, any suitable BCH algorithm may be used for syndrome generation and equation solving implemented to generate syndrome and sigma results used for error detection and correction.

In another example, the ECC bits may be parity bits read from memory array 202. The ECC bits and the data bits may be provided to an ECC encoder, which may use such bits to generate an ECC check value which, for example, may be a Hamming code. The generated Hamming code may be provided to error detector 210 which may, for example, use a Hamming/HSIAO algorithm to determine if up to 2 bits error is present. Accordingly, it will be appreciated that embodiments disclosed herein may use BCH ECC operations, may be configured to use Hamming code-based ECC operations, or may be configured to use any other suitable error correction technique.

Moreover, additional syndrome and coefficient calculators and error detectors may similarly perform such determinations. For example, syndrome and coefficient calculator 218, which may include syndrome generator 234 and equation solver 236, and error detector 220 may make second determinations, and syndrome and coefficient calculator 222, which may include syndrome generator 238 and equation solver 240, and error detector 224 may make third determinations.

In various embodiments, and as will be discussed in greater detail below with reference to FIG. 8, different reference values may result in different data outputs obtained during sensing operations. The different data outputs may result in different ECC calculation results and a different number of detected errors. More specifically, by using different reference voltages, different cutoff voltages are used for reading data and thus generate different data outputs from memory array 202. The different data outputs may then result in different numbers of errors identified during ECC calculations.

In various embodiments, the outputs of error detector 210, error detector 220, and error detector 224 may be provided to selection circuit 212 which is configured to select the output that provides the best result. Such a selection may be made based on which output identifies the fewest number of errors. As discussed above, the use of different reference voltages may result in different data outputs read from memory array 202, which may result in different ECC calculation results, and different numbers of errors being identified by the error detectors. Thus, the identified numbers of errors may be used to generate a selection signal for selection multiplexer 214.

Accordingly, the error detectors may generate outputs that include error detection indicators identifying a number of errors found, and selection circuit 212 may compare the outputs of the error detectors to select the one with the fewest errors. In various embodiments, an output of selection circuit 212 is provided to selection multiplexer 214 which operates as a multiplexer configured to multiplex inputs provided to error corrector 216. In various embodiments, error corrector 216 is configured to perform a Chien search algorithm that may generate outputs provided to XOR gates for XOR operations with the selected data. Thus, the output of the XOR operations may correct bit errors. In this way, error corrector 216 may also perform such Chien search and data repair operations, and the repaired data may be provided as an output that may be returned for a read operation. In various embodiments, error corrector 216 may be configured to perform decoding operations and repair operations associated with a Hamming code. Accordingly, various different ECC implementations are contemplated and disclosed herein. In various embodiments, components of error correction circuits, such as syndrome and coefficient calculators, error detectors, selection circuits, selection multiplexers, and error detectors may be implemented using logic gates and circuits that may be included in an integrated circuit package.

FIG. 3 illustrates another example of a memory device, configured in accordance with some embodiments. As similarly discussed above, a memory device, such as device 300, may include a memory array, a sensing circuit, and an error correction circuit. Moreover, components of device 300 may be configured to perform error correction operations to detect and repair data values included in a memory array. As will be discussed in greater detail below, such components of device 300 may be configured to use multiple reference values, as well as combinations of reference values, to increase capabilities of such error correction operations.

As similarly discussed above, device 300 may include memory array 302 configured to include memory cells, and sensing circuit 304 configured to perform sensing operations. Device 300 may also include error correction circuit 306 that includes multiple syndrome and coefficient calculators and error detectors. For example, device 300 may include syndrome and coefficient calculator 308, syndrome and coefficient calculator 318, syndrome and coefficient calculator 322, and syndrome and coefficient calculator 326. In various embodiments, syndrome and coefficient calculator 308 includes syndrome generator 330 and equation solver 332, syndrome and coefficient calculator 318 includes syndrome generator 334 and equation solver 336, and syndrome and coefficient calculator 322 includes syndrome generator 338 and equation solver 340, and syndrome and coefficient calculator 326 includes syndrome generator 342 and equation solver 344.

Device 300 may further include error detector 310, error detector 320, error detector 324, and error detector 328. Device 300 may also include selection circuit 312 that may be configured to receive outputs from error detectors and select a best reference value. Moreover, device 300 may additionally include selection multiplexer 314 that selects data values and sigma result based on the determination made by selection circuit 312. The output of selection multiplexer 314 may be provided to error corrector 316 which may perform Chien search operations and XOR operations for repair operations to generate an output that includes a returned result for a read operation.

As discussed above, device 300 may be configured to combine two or more reference values for error detection and correction operations. In one example, data bits may be received via a bus of 128 bits. In this example, a second reference voltage may be used to generate a data output that results in the identification of 3 errors in bits 12, 45, 75, and a third reference voltage may be used to generate a data output that results in the identification of three errors in bits 75, 78, 101. In some embodiments, bits [63:0] from the third reference voltage, and bits [127:64] from the second reference voltage may be provided to, for example, syndrome and coefficient calculator 326. Accordingly, in this example, error detector 328 may detect only 1 error, and selection circuit 312 will select this combined data which has only one error (bit 75 from the second reference voltage), which may be fixed by error corrector 316.

Figure 4:
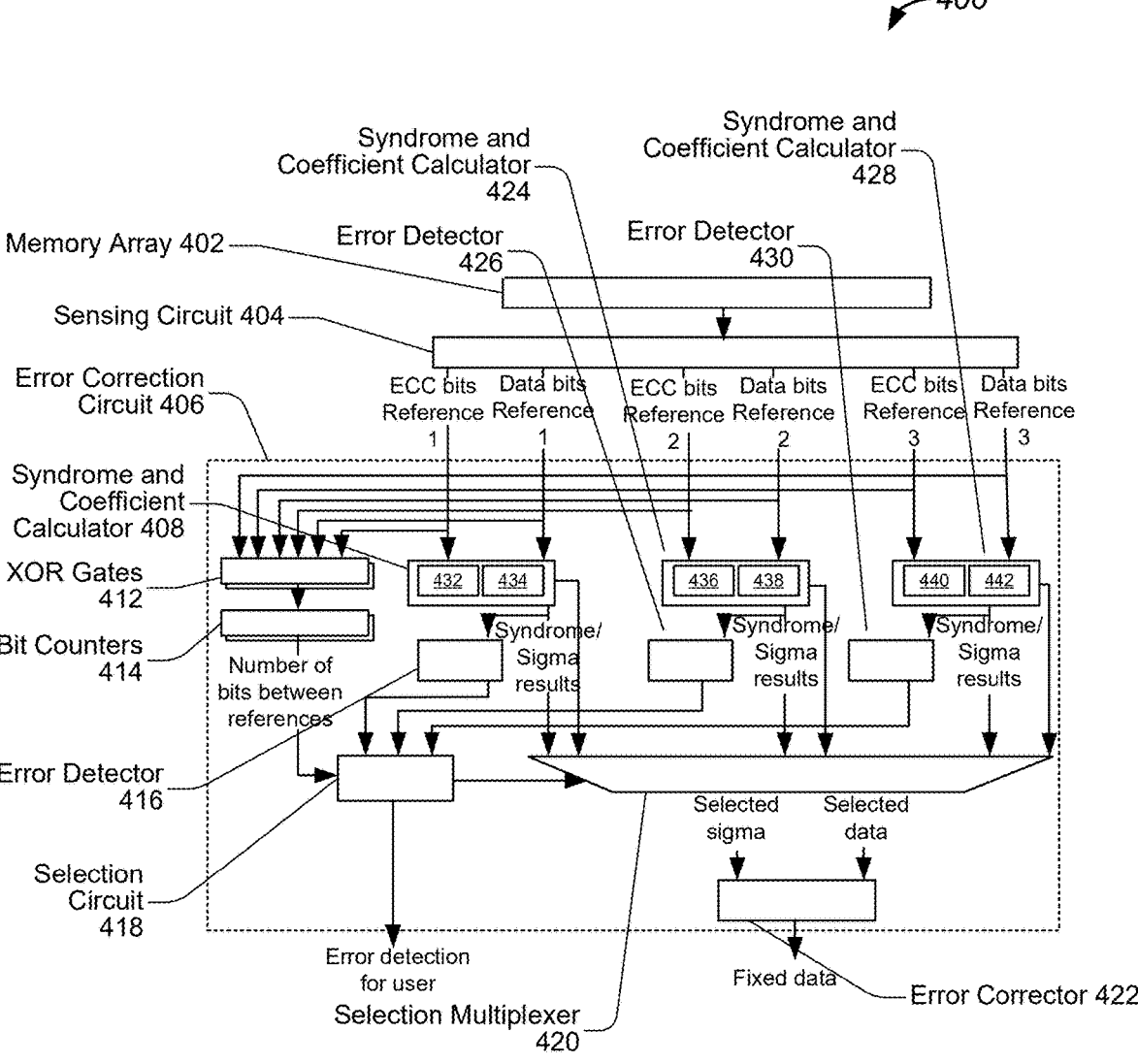
FIG. 4 illustrates an additional example of a memory device, configured in accordance with some embodiments.

FIG. 4 illustrates an additional example of a memory device, configured in accordance with some embodiments. Accordingly, a memory device, such as device 400, may include a memory array, a sensing circuit, and an error correction circuit. Moreover, components of device 400 may be configured to perform error correction operations to detect and repair data values included in a memory array. As will be discussed in greater detail below, such components of device 400 may be configured to use a number of bits between reference values to facilitate selection of a reference value to be used for such error detection and repair operations.

As similarly discussed above, device 400 may include memory array 402 configured to include memory cells, and sensing circuit 404 configured to perform sensing operations. Device 400 may also include error correction circuit 406 that includes multiple syndrome and coefficient calculators and error detectors. For example, device 400 may include syndrome and coefficient calculator 408, syndrome and coefficient calculator 424, and syndrome and coefficient calculator 428. Moreover, syndrome and coefficient calculator 408 includes syndrome generator 432 and equation solver 434, syndrome and coefficient calculator 424 includes syndrome generator 436 and equation solver 438, and syndrome and coefficient calculator 428 includes syndrome generator 440 and equation solver 442.

Device 400 may further include error detector 416, error detector 426, and error detector 430. Device 400 may also include selection circuit 418 that may be configured to receive outputs from error detectors and select a best reference value. Moreover, device 400 may additionally include selection multiplexer 420 that selects data values and sigma result based on the determination made by selection circuit 418. The output of selection multiplexer 420 may be provided to error corrector 422 which may perform Chien search operations and XOR operations for repair operations to generate an output that includes a returned result for a read operation.

In various embodiments, error correction circuit 406 additionally includes XOR gates 412 and bit counters 414. As similarly discussed above, XOR gates 412 and bit counters 414 may be configured to identify a number of bits between reference values. In some embodiments, XOR gates 412 may provide additional selection capabilities for selection circuit 418. More specifically, selection circuit 418 may be configured to implement an order of priority in case a same number of errors is identified based on different reference voltages. For example, XOR calculations performed by a first set of XOR gates and a first bit counter included in XOR gates 412 and an output of bit counters 414 may provide a number of bits between a second reference voltage and a third reference voltage, and a second set of XOR gates included in XOR gates 412 and a second bit counter included in bit counters 414 may be used to determine a number of bits between the second reference voltage and a first reference voltage. So, for example, if there are less bits between the second reference voltage and the first reference voltage, the first reference voltage may be selected instead of the third reference voltage in the event that they independently identify the same number of errors, and a lower number of bits than the second reference voltage.

Figure 5:
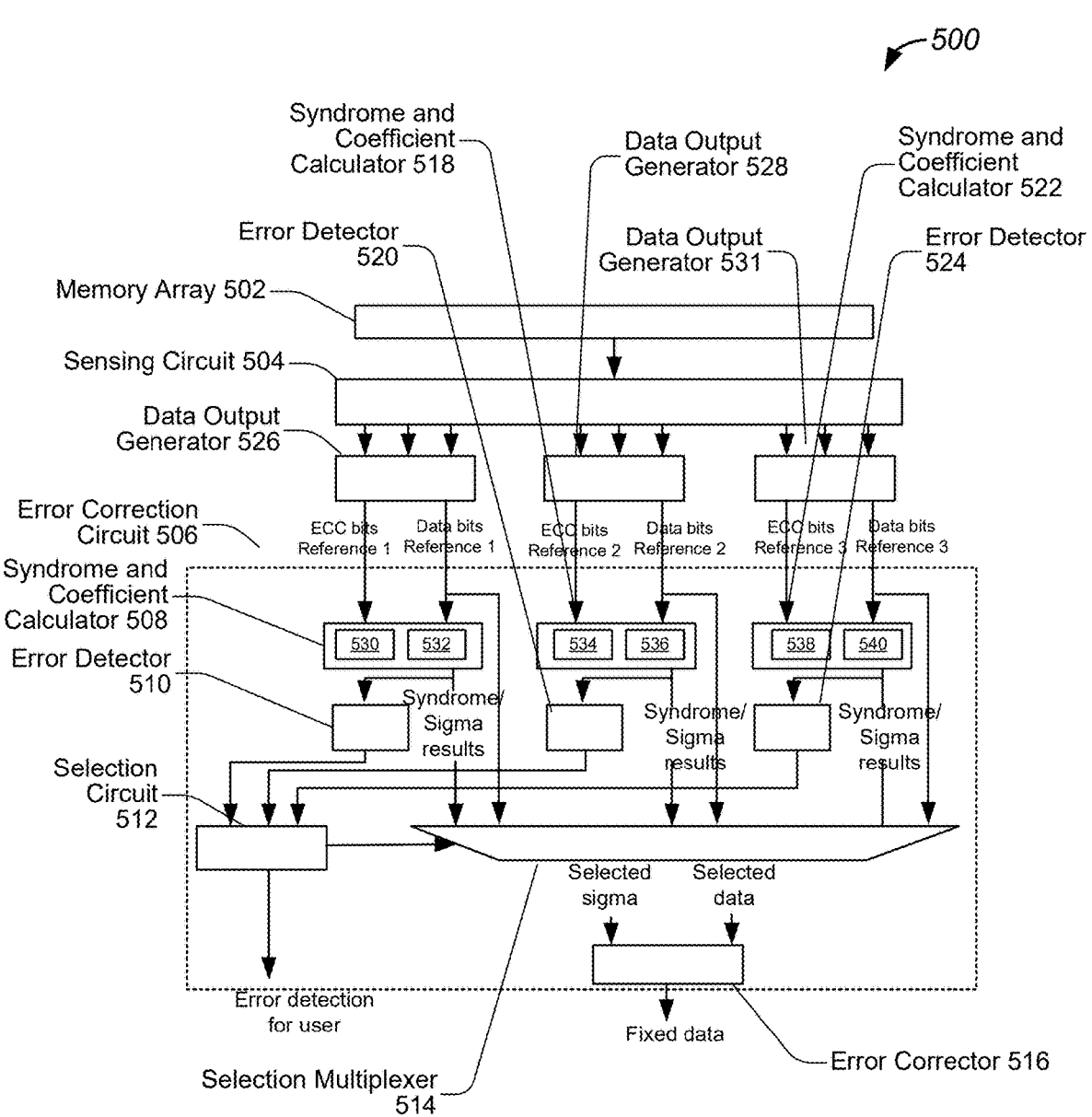
FIG. 5 illustrates another example of a memory device, configured in accordance with some embodiments.

FIG. 5 illustrates another example of a memory device, configured in accordance with some embodiments. Accordingly, a memory device, such as device 500, may include a memory array, a sensing circuit, and an error correction circuit. Moreover, components of device 500 may be configured to perform error correction operations to detect and repair data values included in a memory array. As will be discussed in greater detail below, such components of device 500 may be configured to use one or more groupings of reference values for such error detection and correction operations when a memory cell is a multi-level memory cell.

As similarly discussed above, device 500 may include memory array 502 configured to include memory cells, and sensing circuit 504 configured to perform sensing operations. Device 500 may also include error correction circuit 506 that includes multiple syndrome and coefficient calculators and error detectors. For example, device 500 may include syndrome and coefficient calculator 508, syndrome and coefficient calculator 518, and syndrome and coefficient calculator 522. Moreover, syndrome and coefficient calculator 508 includes syndrome generator 530 and equation solver 532, syndrome and coefficient calculator 518 includes syndrome generator 534 and equation solver 536, and syndrome and coefficient calculator 522 includes syndrome generator 538 and equation solver 540. Device 500 may further include error detector 510, error detector 520, and error detector 524. Device 500 may also include selection circuit 512 that may be configured to receive outputs from error detectors and select a best reference value.

Moreover, device 500 may additionally include selection multiplexer 514 that selects data values and sigma result based on the determination made by selection circuit 512. The output of selection multiplexer 514 may be provided to error corrector 516 which may perform Chien search operations and XOR operations for repair operations to generate an output that includes a returned result for a read operation. For example, error corrector 516 may be configured to perform a Chien search operation in which an assignment is made for each possible value in a polynomial defined by a sigma result. As discussed above, the sigma result may be generated by an equation solver based on a generated syndrome. For bits for which the polynomial result is 0, an error may be identified. Accordingly, a sigma result may be provided to error corrector 516, and for bits for which a polynomial result is 0, an error may be identified and repaired.

In various embodiments, device 500 further includes data output generators that may be configured to generate data outputs based on selected groups of reference values used for a multi-level cell. For example, a memory cell may be capable of storing data values representing a "00", "01", "10", and "11". In various embodiments, a different group of reference values may be used to generate a data output corresponding to an appropriate data value that was read. Accordingly, data output generator 526 may be configured to select a first plurality of reference values to generate a first data output, data output generator 528 may be configured to select a second plurality of reference values to generate a second data output, and data output generator 531 may be configured to select a third plurality of reference values to generate a third data output.

As will be discussed in greater detail below with reference to FIG. 11, three reference values may be used to distinguish between data values during sense/read operations. Accordingly, data output generator 526 may select a first set of reference values, data output generator 528 may select a second set of reference values, and data output generator 531 may select a third set of reference values. As will be discussed in greater detail below with reference to FIG. 11, each set of reference values may include one reference value between data values. For example, data output generator 526 may select a first set of reference values including a first, fourth, and seventh reference value. Moreover, data output generator 528 may select a second set of reference values including a second, fifth, and eighth reference value. Furthermore, data output generator 531 may select a third set of reference values including a third, sixth, and ninth reference value. In this way, different sets of reference values may be used to generate different data outputs used for different error detection operations for each of multiple data values of a multi-level cell.

It will be appreciated that while FIG. 5 illustrates various combinations of references voltages, any suitable combination of reference voltages may be used.

Accordingly, additional data output generators may be included, or different configurations of data output generators may be included that use different combinations of reference voltages than those discussed above. For example, an additional data output generator may receive a first reference voltage, a fifth reference voltage, and an eighth reference voltage, may provide a result to an syndrome and coefficient calculator and an error detector, as similarly discussed above. In this way, device 500 may include data output generators configured to receive any one reference voltage from each distribution gap.

It will also be appreciated that while many embodiments describe multi-level cells, embodiments disclosed herein may also have a core cell configuration of with two single-level bits in one memory cell, or even two multi-level bits in one memory cell. For example, a memory cell may include multiple multi-level storage units with corresponding distributions. More specifically, a memory cell with two multi-level bits, which may be storage units, with four distributions each, will be able to represent four bits per memory cell.

Figure 6:
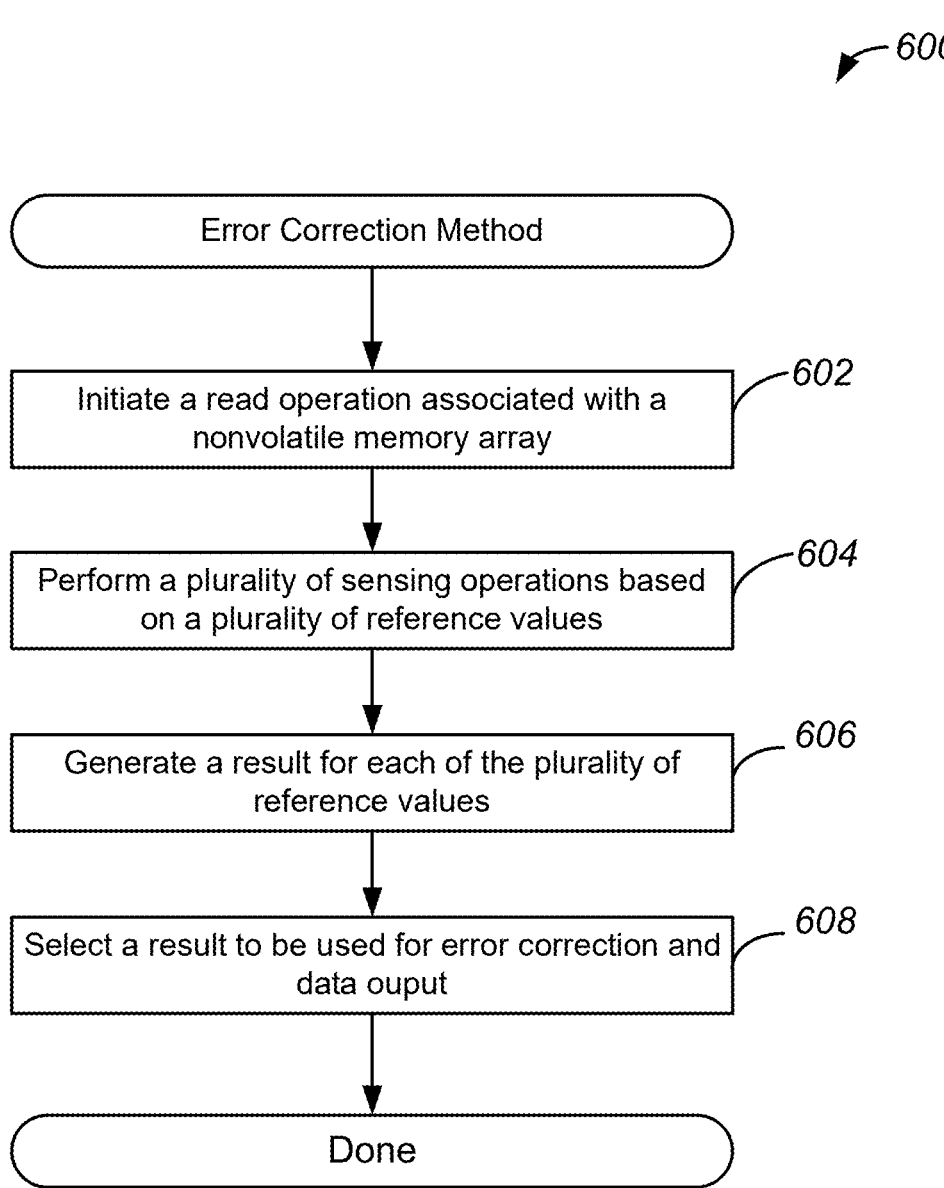
FIG. 6 illustrates an example of a method for error correction, performed in accordance with some embodiments.

FIG. 6 illustrates an example of a method for error correction, performed in accordance with some embodiments. As similarly discussed above, a method, such as method 600, may be performed to implement error correction operations to detect and repair data values included in a memory array. As will be discussed in greater detail below, multiple reference values may be used to improve capabilities of such error correction operations.

Method 600 may perform operation 602 during which a read operation may be initiated for a nonvolatile memory array. As discussed above, data values may be stored in a nonvolatile memory array, and may be read out during execution of a read operation that may be requested by one or more other components, such as a host processor. Accordingly, during operation 602, a read request may be received from a system component, such as a host processor, and may cause the initiation of a read operation to read data values from the nonvolatile memory array.

Method 600 may perform operation 604 during which a plurality of sensing operations may be performed based on a plurality of reference values. As also discussed above, sensing operations may be performed by a sensing circuit upon one or more memory cells associated with the read operation. Accordingly, data values such as ECC bits and data bits may be read from the memory array using the sensing circuit. Moreover, sensing operations may be performed using multiple different reference values. As similarly discussed above, a reference value may be used to identify the data value stored in a particular memory cell.

Accordingly, during operation 604 multiple sensing operations and identifications of data values may be performed based on the different reference values.

Method 600 may perform operation 606 during which a result may be generated for each of the plurality of reference values. Accordingly, ECC encoding operations and error detection operations may be performed for each reference value and its associated data values. As similarly discussed above, a result and an error determination may be generated for each reference value. The error determinations may be provided to a selection circuit, and the results may be provided to a selection multiplexer.

Method 600 may perform operation 608 during which a result may be selected to be used for error correction. Accordingly, the selection circuit may identify data values and a sigma result that should be used for error correction operations, and may generate a selection signal provided to the selection multiplexer that selects the result associated with that reference value. In some embodiments, the reference value may be identified based on a fewest number of errors or other quality metric associated with the error detection operations. The selected result may then be provided to an error corrector, and the repaired data may be provided as an output of the read operation.

FIG. 7 illustrates another example of a method for error correction, performed in accordance with some embodiments. As similarly discussed above, a method, such as method 700, may be performed to implement error correction operations to detect and repair data values included in a memory array. As will be discussed in greater detail below, multiple reference values may be used to improve capabilities of such error correction operations.

Method 700 may perform operation 702 during which a read operation may be initiated for a nonvolatile memory array. As similarly discussed above, data values may be stored in a nonvolatile memory array, and may be read out during execution of a read operation that may be requested by one or more other components, such as a host processor. Accordingly, during operation 702, a read request may be received from a system component, such as a host processor, and may cause the initiation of a read operation to read data values from the nonvolatile memory array. In various embodiments, the read operation may be for a particular memory cell or group of memory cells within the memory array.

Method 700 may perform operation 704 during which a plurality of sensing operations may be performed based on a plurality of reference values. As also discussed above, sensing operations may be performed by a sensing circuit upon one or more memory cells associated with the read operation. Accordingly, data values such as ECC bits and data bits may be read from the memory array using the sensing circuit. Moreover, sensing operations may be performed using multiple different reference values. As similarly discussed above, a reference value may be used to identify the data value stored in a particular memory cell based on a comparison of the sensed value, which may be a voltage, to the reference value.

As similarly discussed above, three reference values may be used for sensing and data output operations. As will be discussed in greater detail below with reference to FIG. 8, the three reference values may be distributed between two distributions of sensed values representing two states of a memory cell. Accordingly, during operation 704 sensing operations and identifications of data values may be performed using each of the three different reference values.

Method 700 may perform operation 706 during which syndrome generation and equation solving operations may be performed for each sensing result. Accordingly, each result of each sensing operation may be provided to a syndrome calculator that may be configured to compute syndromes and coefficients for data values, as similarly discussed above. For example, the syndrome calculator may generate a syndrome result that may be provided to an equation solver which may provide an output to an error detector, as will be discussed in greater detail below.

Method 700 may perform operation 708 during which error detection operations may be performed for each sensing result. As similarly discussed above, an error detector associated with each syndrome calculator as well as equation solver may perform error detection operations to determine if one or more errors are present. As similarly discussed above, an error detector may be implemented for each equation solver and each reference value. Thus, the error detectors may perform error detection operations in parallel for the equation solver outputs associated with the three different reference values.

Method 700 may perform operation 710 during which a result may be selected to be used for error correction. Accordingly, the selection circuit may identify data values and a sigma result that should be used for error correction operations, and may generate a selection signal provided to a selection multiplexer that selects the result associated with that reference value.

As similarly discussed above, the selected data values and a sigma result may be identified based on a fewest number of errors or other quality metric associated with the error detection operations. More specifically, different reference values may result in different results and determinations of whether or not an error is present. For example, a first reference value may result in the identification of multiple errors. The presence of multiple errors may be unrepairable by ECC repair operations. Moreover, the actual number of errors may be higher than the number of errors identified by the error detector. However, the use of a second reference value results in an identification of a fewer number of errors which may be repairable by ECC repair operations. Thus, the use of the second reference value and associated equation solver result may allow for data repair operations to be performed. Such data repair operations may be used to attribute the erroneous data value, as identified by the error, to a particular data distribution thus correcting the erroneous data value. Accordingly, the use of the second reference value and its associated equation solving and syndrome computation operations may result in a determination that is repairable.

Moreover, in this example, the error detection calculation associated with the second reference value may identify a single error, and thus have the fewest number of errors. In various embodiments, the selection circuit is configured to identify the result having the fewest number of errors, and generate a selection signal that selects the associated data values and sigma result. Additional details regarding such errors and distributions are discussed in greater detail below with reference to FIG. 8.

Method 700 may perform operation 712 during which the selected result may be used for one or more error correction operations. Accordingly, the selection circuit may provide the selected data values and sigma result to a component, such as an error corrector, which may perform error correction operations upon the data values. As similarly discussed above, the error corrector may be configured to perform Chien search operations as well as XOR operations that are used to correct the data values. For example, the output of the XOR gates may be provided as an output that includes the corrected data. Accordingly, a repaired result may be provided as an output and a returned result for the read operation initially requested during operation 702.

Figure 8:
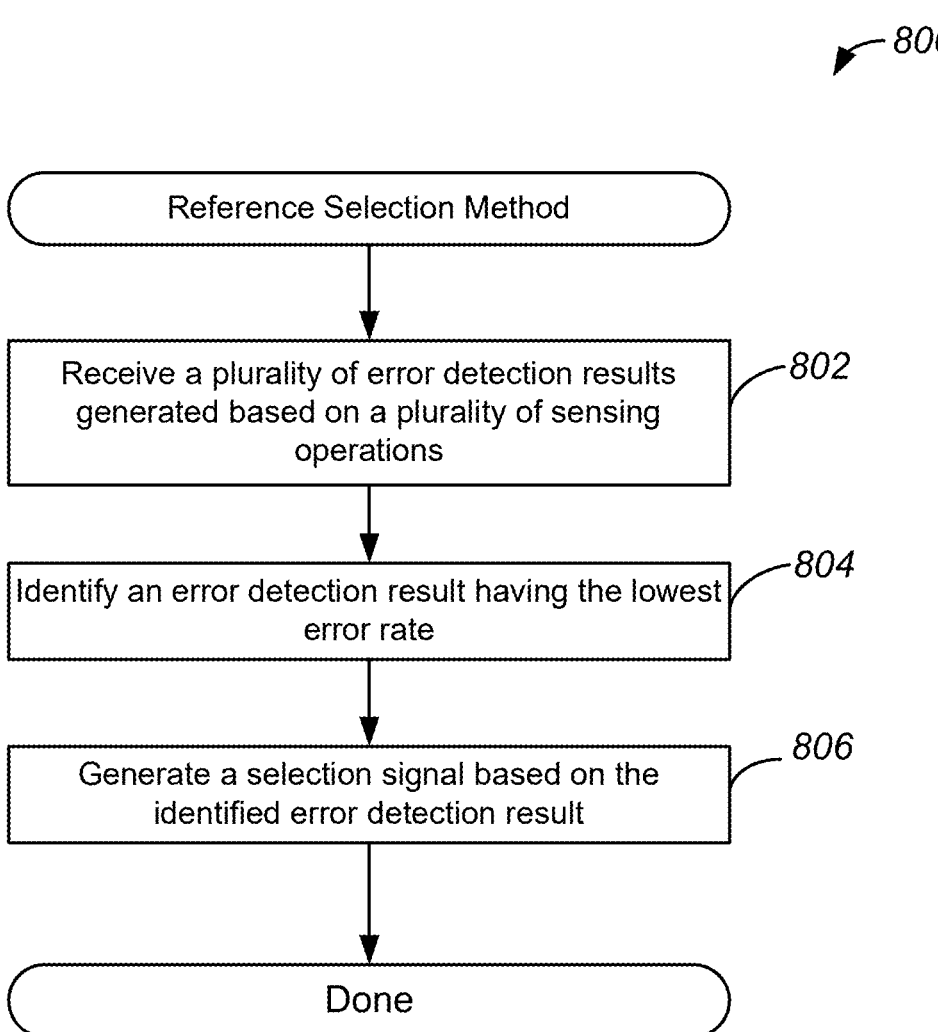
FIG. 8 illustrates an example of a method for reference selection, performed in accordance with some embodiments.

FIG. 8 illustrates an example of a method for reference selection, performed in accordance with some embodiments. As similarly discussed above, different reference values may generate different error detection results that may have different efficacies in error repair operations. Accordingly, a method, such as method 800, may be performed to identify and select data values and associated ECC results that improve the capabilities of such error correction operations.

Method 800 may perform operation 802 during which a plurality of error detection results may be generated based on a plurality of sensing operations. As similarly discussed above, sensing operations may be performed by a sensing circuit upon one or more memory cells associated with a read operation, and results of such sensing operations may be provided to equation solvers and error detectors to perform equation solving operations, syndrome computation operations, and error detection operations. The error detection operations may generate outputs that identify a number of errors found for the computations performed using the different reference values.

Method 800 may perform operation 804 during which an error detection result having the lowest error rate may be identified. As similarly discussed above, the lowest error rate may be determined based on a number of errors identified based on the error detection operations, and as may be identified based on computed syndromes and sigma results. Accordingly, a selection circuit may compare the error detection results generated by the error detectors, and may identify an error detection result that has the fewest errors. In some embodiments, if two or more reference values produce the same number of errors, a designated order of reference values may be used to identify a default reference value to use, as may be determined by an entity such as a manufacturer.

Method 800 may perform operation 806 during which a selection signal may be generated. In some embodiment, a selection circuit may generate a selection signal that is configured to select the identified error detection result. For example, if a result generated by a second equation solver associated with a second reference value is selected, the selection signal may configure a selection multiplexer to select the result generated by the second equation solver as well as its associated data values. As discussed above, the result may include error correction data as well as the underlying data values to be corrected.

FIG. 9 illustrates an example of a method for error correction, performed in accordance with some embodiments. As similarly discussed above, a method, such as method 900, may be performed to implement error correction operations to detect and repair data values included in a memory array. As will be discussed in greater detail below, various groups of reference values may be used for multilevel memory cells.

Method 900 may perform operation 902 during which a read operation may be initiated for a nonvolatile memory array. As similarly discussed above, data values may be stored in a nonvolatile memory array, and may be read out during execution of a read operation that may be requested by one or more other components, such as a host processor. Accordingly, during operation 902, a read request may be received from a system component, such as a host processor, and may cause the initiation of a read operation to read data values from the nonvolatile memory array. In various embodiments, the read operation may be for a particular memory cell or group of memory cells within the memory array.

Method 900 may perform operation 904 during which a plurality of sensing operations may be performed based on a plurality of groups of reference values. As also discussed above, sensing operations may be performed by a sensing circuit upon one or more memory cells associated with the read operation. Accordingly, data values such as ECC bits and data bits may be read from the memory array using the sensing circuit. Moreover, sensing operations may be performed using multiple different reference values.

As will be discussed in greater detail below, multiple sets of reference values may be used between different data distributions of a multi-level cell capable of representing multiple data values. For example, three sets of three reference values may be used, and the sensing operations may be performed to create a data output for each set of reference values. Accordingly, as a result of the sensing operations, three data outputs may be generated where one data output is generated for each set of reference values as similarly discussed above with reference to FIG. 5.

Method 900 may perform operation 906 during which syndrome generation and equation solving operations may be performed for each group of reference values. As similarly discussed above, data outputs including results of sensing operations may be provided to syndrome calculators and equation solvers that may be configured to compute syndromes and coefficients based, at least in part, on the received data outputs. For example, the syndrome calculator may generate a syndrome result that may be provided to an equation solver which may then generate a sigma result that may then be provided to an error detector. In one example, if there are three sets of reference values, three syndrome calculation and equation solving operations may be performed in parallel, where one set of syndrome calculation and equation solving operations is performed for each data output associated with a set of reference values.

Method 900 may perform operation 908 during which error detection operations may be performed for each data output associated with a group of reference values. As similarly discussed above, an error detector associated with each equation solver may receive an output of the equation solver and perform error detection operations to determine if one or more errors are present. As also discussed above, an error detector may be implemented for each equation solver. Thus, the error detectors may perform error detection operations in parallel for the equation solver outputs associated with the three different reference values. Accordingly, if there are three sets of reference values, three error detection operations may be performed in parallel, where one set of error detection operations is performed for each set of reference values.

Method 900 may perform operation 910 during which results may be selected to be used for error correction. Accordingly, the selection circuit may identify a sigma result and associated data values that should be used for error correction operations discussed above. The selection circuit may also generate a selection signal provided to a selection multiplexer that selects the result for the error correction operation. As similarly discussed above, sigma results and data values are selected based on a fewest number of errors or other quality metric associated with the error detection operations.

Method 900 may perform operation 912 during which the selected results may be used for one or more error correction operations. Accordingly, the selection circuit may provide the selected results to a component, such as an error corrector, which may perform error correction operations for each of the data distributions and their associated data values. The repaired results may be provided as an output and a returned result for the read operation initially requested during operation 902.

Figure 10:
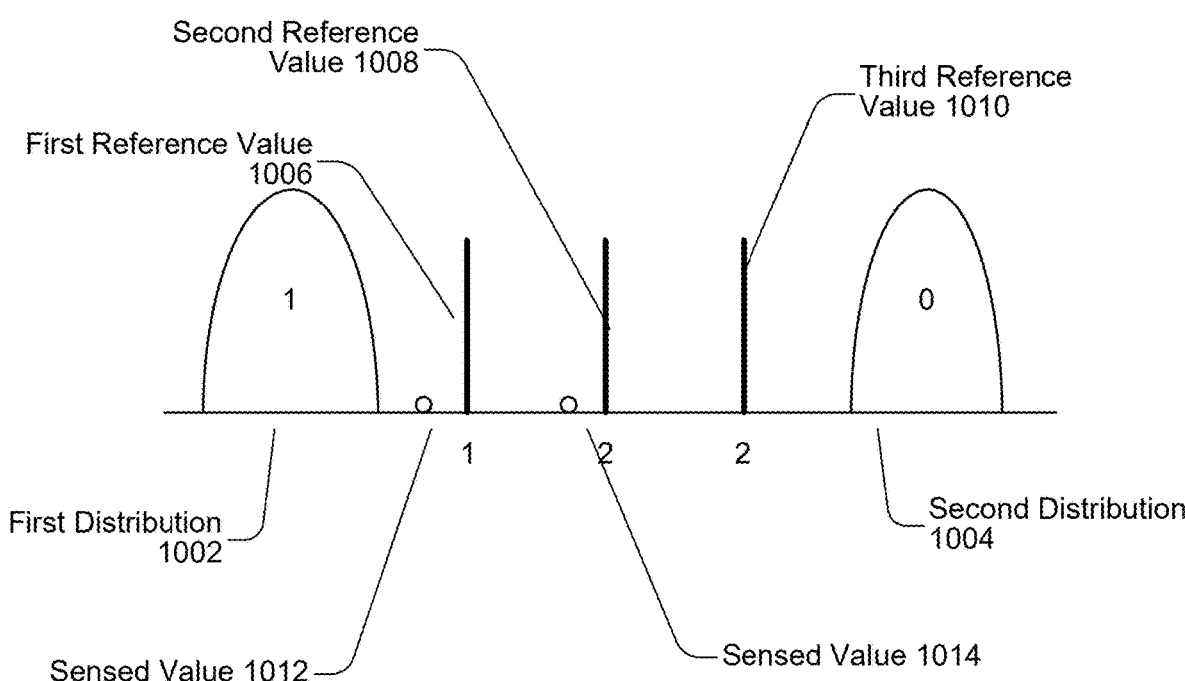
FIG. 10 illustrates a diagram of an example of data value distributions, configured in accordance with some embodiments.

FIG. 10 illustrates a diagram of an example of data value distributions, configured in accordance with some embodiments. As similarly discussed above, a memory cell may be configured to be programmed with data values based on different voltages representing different states. For example, a memory cell may be programmed by an entity, such as a host processor, to store a data value that may represent a "1" or a "0". Moreover, such data values may be read out of the memory cell based on sense operations in which a voltage measurement may be made for the memory cell to read the programmed voltage and infer a data value based on a comparison between the sensed value and an associated reference value.

As shown in FIG. 10, first distribution 1002 may represent a distribution or cluster of sensed voltages that may be associated with an erased first data value of "1", and second distribution 1004 may represent a distribution or cluster of sensed voltages that may be associated with a programmed second data value of "0". As discussed above, multiple programming and erase operations may have been previously performed to program and erase voltages corresponding to "0" and "1" data values respectively. When data is read out of the memory array, sensing operations may be performed to then measure the programmed voltage and obtain the voltages represented in image 1000. During such read operations, reference voltages may be used as cutoff voltages to assign a sensed voltage a data value and thus infer what the originally programmed data value, which may be a data bit, was.

In various embodiments, sensed value 1012 and sensed value 1014 may each represent sensed voltages obtained from a memory array when data is read out of the memory array. The originally programmed value underlying both of the sensed values may have been associated with the second data value of "0". However, during the read operation, the sensed voltages obtained for sensed value 1012 and sensed value 1014 may have a higher variance within second distribution 1004 relative to a center or average of second distribution 1004, which as discussed above is associated with the second data value.

As shown in FIG. 10 and as similarly discussed above, multiple reference values may be used for such sensing operations and error detection. Moreover, the reference values may be distributed at designated intervals between first distribution 1002 and second distribution 1004. More specifically, the reference values may include first reference value 1006, second reference value 1008, and third reference value 1010 that may be configured to represent voltages distributed between centers of first distribution 1002 and second distribution 1004. Depending on a reference voltage used, one or more of sensed value 1012 and sensed value 1014 may be incorrectly attributed to an incorrect data value. For example, second reference value 1008 and third reference value 1010 may both result in the incorrect attribution of sensed value 1012 and sensed value 1014 to the first data value of "1", thus resulting in two errors. In this example, first reference value 1006 incorrectly attributes only sensed value 1012 to the first data value of "1", thus resulting in one error. Accordingly, the use of first reference value 1006 may result in the lowest error rate for selection operations as discussed above. Moreover, since first reference value 1006 identifies a single error and has the lowest error rate, it may be fixed using an ECC correction operations, such as a Hamming code-based operation. Whereas, the other reference values would not be able to be fixed using such Hamming code-based operations. As discussed above, such error detection and repair operations may be performed to attempt to repair such sensed values and properly attribute them to the correct data value. For example, a "0" may be corrected to a "1", or a "1" may be corrected to a "0".

Figure 11:
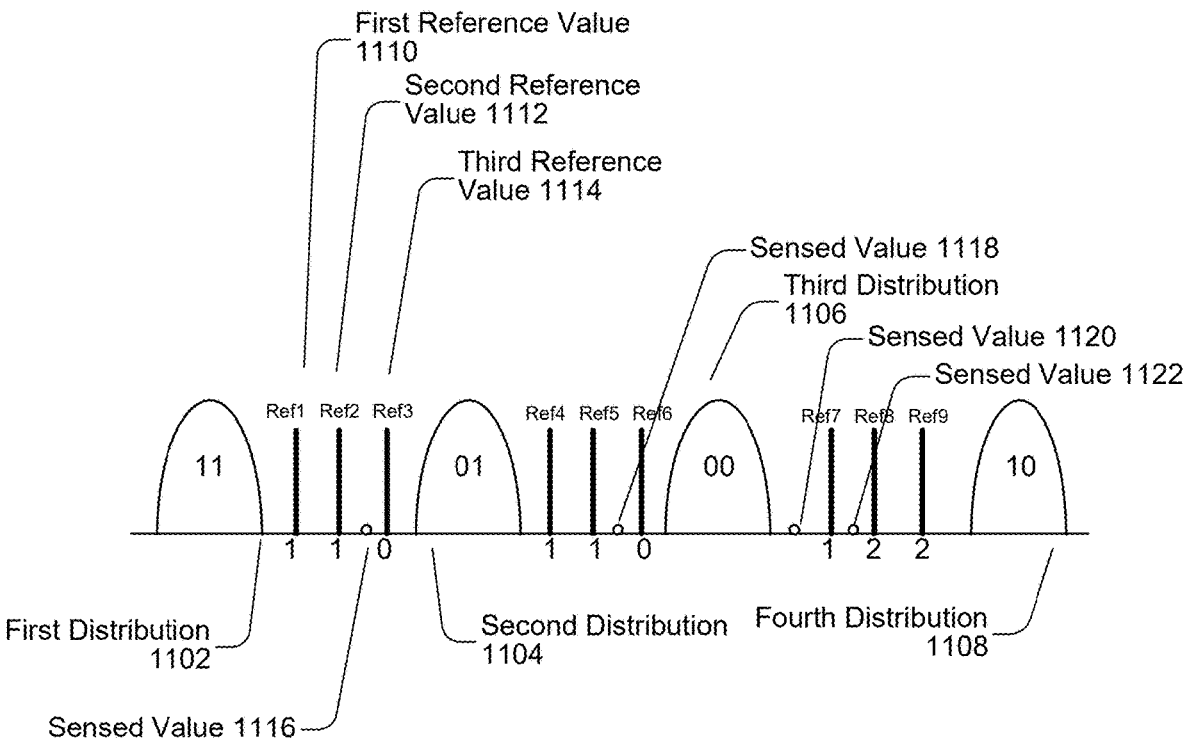
FIG. 11 illustrates a diagram of another example of data value distributions, configured in accordance with some embodiments.

FIG. 11 illustrates a diagram of another example of data value distributions, configured in accordance with some embodiments. As similarly discussed above, a memory cell may be configured to store data values representing different states. For example, a multi-level memory cell may store data values that may represent a "00", a "01", a "10", or a "11". As also discussed above, such data values may be programmed and erased via various programming and erase operations, and may subsequently be sensed during read operations as data is read out of the memory array. Accordingly, image 1100 illustrates sensed voltages obtained as a result of such read operations.

As shown in FIG. 11, first distribution 1102 may be sensed voltages associated with a first state of "11", second distribution 1104 may be sensed voltages associated with a second state of "01", third distribution 1106 may be sensed voltages associated with a second state of "00", and fourth distribution 1108 may be sensed voltages associated with a fourth state of "10".

As shown in FIG. 11, different sets of reference values may be used between data distributions. For example, between first distribution 1102 and second distribution 1104, there may be first reference value 1110, second reference value 1112, and third reference value 1114. Similarly, three different reference values may be used between second distribution 1104 and third distribution 1106, and an additional three reference values may be used between third distribution 1106 and fourth distribution 1108.

As shown in FIG. 11, sensed values, such as sensed value 1116 and sensed value 1118, that fall between distributions may be subject to error detection and repair operations performed based on their respective sets of reference values. More specifically, sensed value 1116 may have originally been associated with data values of "11" and part of first distribution 1102. However, first reference value 1110 and second reference value 1112 may incorrectly attribute it to second distribution 1104, and thus result in an error. Meanwhile third reference value 1114 may correctly attribute it to first distribution 1102.

Moreover, sensed value 1118 may have originally been associated with data values of "01" and part of second distribution 1104. However, a fourth reference value and a fifth reference value may incorrectly attribute it to third distribution 1106, and thus result in an error. Meanwhile a sixth reference value may correctly attribute it to second distribution 1104.

Furthermore, sensed value 1120 and sensed value 1122 may have originally been associated with data values of "10" and part of fourth distribution 1108. However, an eighth reference value and a ninth reference value may incorrectly attribute both of them to third distribution 1106, and thus result in two errors. Meanwhile a seventh reference value may correctly attribute sensed value 1122 to fourth distribution 1108 while incorrectly attributing sensed value 1120 to third distribution 1106, thus resulting in one error. In various embodiments, the numbers of errors may be aggregated to determine which set of reference values resulted in the fewest number of errors. For example, a first number of errors may be determined based on a total number of errors using the first, fourth, and seventh reference values. In this example, the first number of errors may be three. Moreover, a second number of errors may be determined based on a total number of errors using the second, fifth, and eighth reference values. In this example, the second number of errors may be four. Furthermore, a third number of errors may be determined based on a total number of errors using the third, sixth, and ninth reference values. In this example, the third number of errors may be two. Accordingly, the third number of errors may be lowest and the third set of reference values may result in the lowest error rate.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
identifying a read operation associated with a nonvolatile memory array;
performing a plurality of sensing operations on the nonvolatile memory array, the plurality of sensing operations comprising a plurality of comparisons between sensed values and reference values;
generating a plurality of data outputs based on the plurality of sensing operations;
generating a plurality of results based on the plurality of data outputs, wherein each of the plurality of results identifies a number of errors associated with at least one of the plurality of data outputs; and
selecting a data output of the plurality of data outputs based, at least in part, on the identified number of errors.

2. The method of claim 1, wherein each of the plurality of sensing operations comprises:
comparing a measured voltage with one or more of the plurality of reference values.

3. The method of claim 1, wherein the generating of the plurality of results comprises:
generating a syndrome result and a sigma result; and
performing a Chien search operation on the sigma result.

4. The method of claim 3 further comprising:
performing a XOR operation on an output of the Chien search operation and the associated data output to correct the errors.

5. The method of claim 3, wherein the selecting of the data output further comprises:
selecting the result from the plurality of results that identifies the fewest errors.

6. The method of claim 1, wherein the plurality of reference values comprises three different reference values.

7. The method of claim 6, wherein the plurality of reference values have voltage values distributed between peaks of distributions associated with data states associated with a memory cell.

8. The method of claim 1 further comprising:
providing the selected result to an error corrector via a selection multiplexer; and
performing one or more error correction operations on the selected result to repair data included in the selected result.

9. The method of claim 8 further comprising:
providing to the selected result to a host processor as a result of the read operation.

10. A system comprising:
a host processor configured to request a read operation;
a nonvolatile memory comprising:
a nonvolatile memory array;
a sensing circuit configured to perform a plurality of sensing operations on the nonvolatile memory array, the plurality of sensing operations comprising a plurality of comparisons between sensed values and reference values; and
an error correction circuit configured to:
generate a plurality of data outputs based on the plurality of sensing operations;
generate a plurality of results based on the plurality of data outputs, wherein each of the plurality of results identifies a number of errors associated with at least one of the plurality of data outputs; and
select a data output of the plurality of data outputs based, at least in part, on the identified number of errors.

11. The system of claim 10, wherein the sensing circuit is further configured to:
compare a measured voltage with one or more of the plurality of reference values.

12. The system of claim 10, wherein the error correction circuit is further configured to:
generate a syndrome result and a sigma result; and
perform a Chien search operation on the sigma result.

13. The system of claim 12, wherein the error correction circuit further comprises:
a plurality of syndrome and coefficient calculators; and
a plurality of error detectors, wherein one of the plurality of syndrome and coefficient calculators and one of the plurality of error detectors is associated with each of the plurality of reference values.

14. The system of claim 10, wherein the error correction circuit is further configured to:
select the result from the plurality of results that identifies the fewest errors.

15. The system of claim 14, wherein the plurality of reference values have voltage values distributed between peaks of distributions associated with data states associated with a memory cell.

16. A device comprising:
a nonvolatile memory array;
a sensing circuit configured to perform a plurality of sensing operations on the nonvolatile memory array, the plurality of sensing operations comprising a plurality of comparisons between sensed values and reference values; and
an error correction circuit configured to:
generate a plurality of data outputs based on the plurality of sensing operations;
generate a plurality of results based on the plurality of data outputs, wherein each of the plurality of results identifies a number of errors associated with at least one of the plurality of data outputs; and
select a data output of the plurality of data outputs based, at least in part, on the identified number of errors.

17. The device of claim 16, wherein the sensing circuit is further configured to:
measure a voltage based, at least in part, on one of the plurality of reference values, wherein the plurality of reference values have voltage values distributed between peaks of distributions associated with data states associated with a memory cell.

18. The device of claim 16, wherein the error correction circuit is further configured to:

generate a syndrome result and a sigma result; and perform a Chien search operation on the sigma result.

19. The device of claim 18, wherein the error correction circuit further comprises:

a plurality of syndrome and coefficient calculators; and a plurality of error detectors, wherein one of the plurality of syndrome and coefficient calculators and one of the plurality of error detectors is associated with each of the plurality of reference values.

20. The device of claim 19, wherein the error correction circuit is further configured to:

select the result from the plurality of results that identifies the fewest errors.

\* \* \* \* \*